(12) United States Patent
Handlogten et al.

(10) Patent No.: US 7,519,752 B2
(45) Date of Patent: Apr. 14, 2009

(54) APPARATUS FOR USING INFORMATION AND A COUNT IN REISSUING COMMANDS REQUIRING ACCESS TO A BUS AND METHODS OF USING THE SAME

(75) Inventors: Glen H. Handlogten, Rochester, MN (US); David A. Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 11/348,968

(22) Filed: Feb. 7, 2006

(65) Prior Publication Data

US 2007/0186012 A1      Aug. 9, 2007

(51) Int. Cl.
*G06F 13/00* (2006.01)
(52) U.S. Cl. ............................. 710/107; 710/5; 710/39; 710/112
(58) Field of Classification Search ................. 710/5–6, 710/107, 110–113, 36–44
See application file for complete search history.

(56) References Cited

U.S. PATENT DOCUMENTS 6,256,740 B1 * 7/2001 Muller et al. ................. 726/12
6,467,032 B1 * 10/2002 Lippert ........................ 711/150
7,290,074 B2 * 10/2007 Asano et al. ................ 710/110

* cited by examiner

*Primary Examiner*—Raymond N Phan
(74) *Attorney, Agent, or Firm*—Dugan & Dugan

(57) ABSTRACT

In a first aspect, a first method of reissuing a command involving bus access is provided. The first method includes the steps of (1) storing information associated with commands that are to be reissued, wherein the commands are each associated with respective input/output (I/O) devices seeking bus access; (2) storing a count for each of the commands, each count indicating a number of times the associated command has been reissued; (3) selecting a command to be reissued, from among the commands, based on the information associated with the command; and (4) determining a delay after which the selected command will be reissued, wherein the delay is determined based on the count associated with the selected command. Numerous other aspects are provided.

25 Claims, 2 Drawing Sheets

APPARATUS FOR USING INFORMATION AND A COUNT IN REISSUING COMMANDS REQUIRING ACCESS TO A BUS AND METHODS OF USING THE SAME

FIELD OF THE INVENTION

The present invention relates generally to computer systems, and more particularly to apparatus for reissuing commands requiring access to a bus and methods of using the same.

BACKGROUND

A computer system may include one or more processors and memories coupled to a bus. Further, one or more input/output (I/O) devices may be coupled to the bus via an I/O interface. During operation, one or more of the processors and/or I/O devices may issue respective commands that require access to the bus. Because only one command may access the bus during a cycle, if a plurality of such commands require bus access during the same clock cycle, all or all but one of the commands may be denied bus access. Therefore, the commands must be retried (e.g., issued again at a later time). However, some or all of the commands may be retried during the same clock cycle, and therefore, all or all but one of the reissued commands must be reissued again, and so on.

To address such a problem, a conventional system may include command reissuing logic including independent sets of logic corresponding to commands from I/O devices, respectively, that may require access to the bus. When a command is retried, a set of logic corresponding to the command may create a random (e.g., pseudo-random) delay time based on a number of times the command has been retried. The command may be retried after waiting the delay time. However, such command retry logic requires a large amount of hardware, and therefore, chip real estate. Consequently, such a conventional system is costly. Accordingly, improved command retry logic and methods of using the same are desired.

SUMMARY OF THE INVENTION

In a first aspect of the invention, a first method of reissuing a command involving bus access is provided. The first method includes the steps of (1) storing information associated with commands that are to be reissued, wherein the commands are each associated with respective input/output (I/O) devices seeking bus access; (2) storing a count for each of the commands, each count indicating a number of times the associated command has been reissued; (3) selecting a command to be reissued, from among the commands, based on the information associated with the command; and (4) determining a delay after which the selected command will be reissued, wherein the delay is determined based on the count associated with the selected command.

In a second aspect of the invention, a first apparatus for reissuing a command involving bus access is provided. The first apparatus includes command reissuing logic having (1) a register; and (2) an array coupled to the register. The command reissuing logic is adapted to (a) store information associated with commands that are to be reissued, wherein the commands are each associated with respective input/output (I/O) devices seeking bus access; (b) store a count for each of the commands, each count indicating a number of times the associated command has been reissued; (c) select a command to be reissued, from among the commands, based on the information associated with the command; and (d) determine a delay after which the selected command will be reissued, wherein the delay is determined based on the count associated with the selected command.

In a third aspect of the invention, a first system is provided. The first system includes (1) a processor; (2) a plurality of input/output (I/O) devices; (3) a bus, coupled to the I/O devices and the processor, and adapted to receive commands from the I/O devices and the processor; and (4) an apparatus for reissuing a command involving bus access including command reissuing logic having (a) a register; and (b) an array coupled to the register. The command reissuing logic is adapted to (i) store information associated with commands that are to be reissued, wherein the commands are each associated with respective input/output (I/O) devices seeking bus access; (ii) store a count for each of the commands, each count indicating a number of times the associated command has been reissued; (iii) select a command to be reissued, from among the commands, based on the information associated with the command; and (iv) determine a delay after which the selected command will be reissued, wherein the delay is determined based on the count associated with the selected command. Numerous other aspects are provided, as are systems and apparatus in accordance with these other aspects of the invention.

Other features and aspects of the present invention will become more fully apparent from the following detailed description, the appended claims and the accompanying drawings.

DETAILED DESCRIPTION

The present invention provides improved command reissuing (e.g., retry) logic for a computer system, and methods of using the same. More specifically, the present invention provides command retry logic corresponding to commands from a plurality of I/O devices that may require access to the bus. For example, the improved command retry logic includes a single set of logic adapted to track which commands corresponding to the plurality of I/O devices have been retried, track a number of times each command has been retried, and create a delay time for a selected retried command based on the number of times the selected command has been retried previously. After the delay time, the selected retried command may be retried again. By using a single set of logic that corresponds to all commands from I/O devices that may require access to the bus, the command retry logic may reduce logic, and consequently, chip real estate required to retry commands in a computer system. Consequently, the command retry logic for the computer system is improved.

Figure 1:
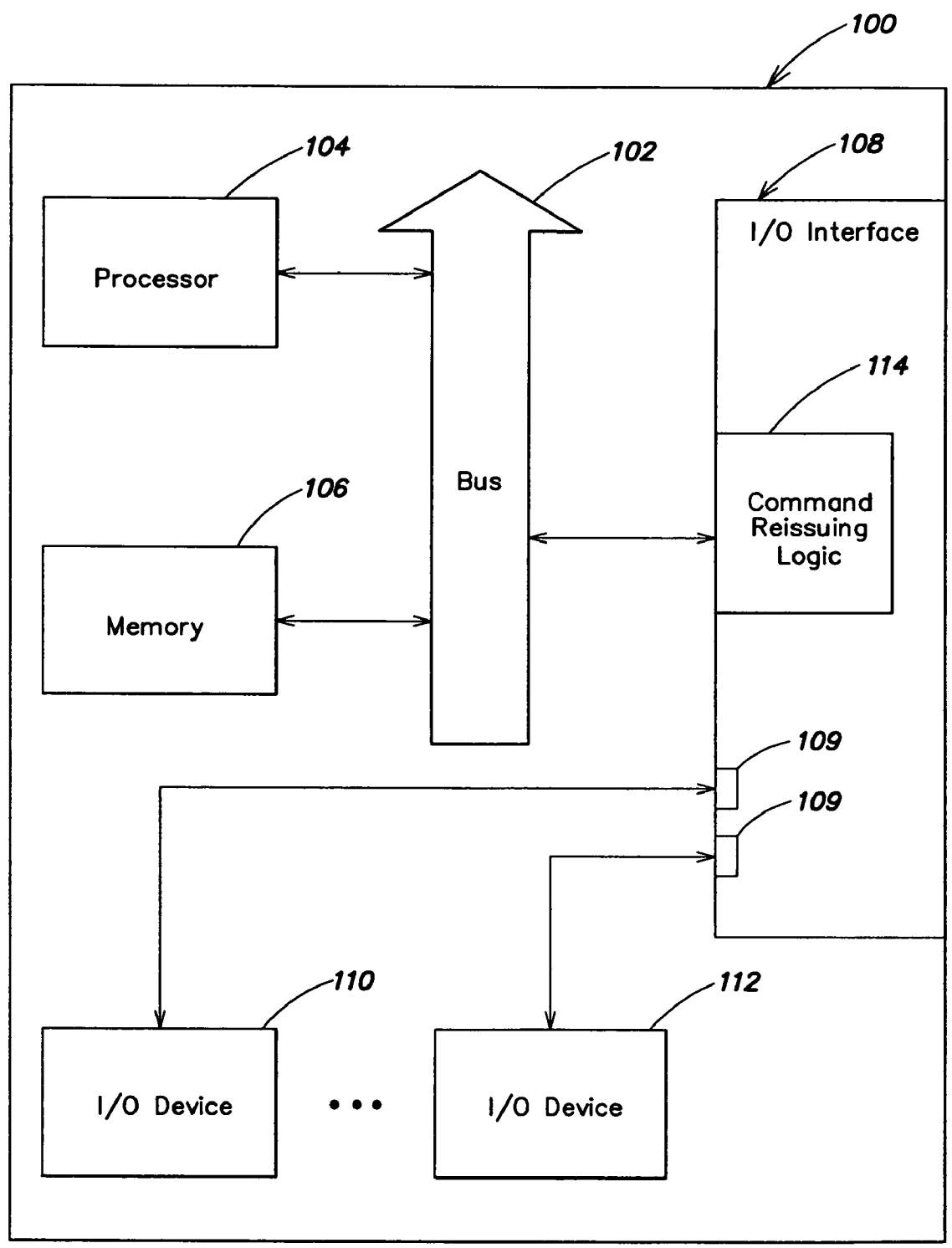
FIG. 1 illustrates a system including command reissuing logic in accordance with an embodiment of the present invention.

FIG. 1 illustrates a system including command reissuing logic in accordance with an embodiment of the present invention. With reference to FIG. 1, the system 100 may be a computer, server or similar device. The system 100 may include a bus 102. In some embodiments, the bus 102 may be an element interconnect bus (EIB) manufactured by the assignee of the present invention, IBM Corporation of Armonk, N.Y. The system 100 may include one or more processors 104 (only one shown) coupled to the bus 102.

Similarly, the system 100 may include one or more memories 106 (only one shown) coupled to the bus 102. Additionally, the system 100 may include an input/output (I/O) interface 108 adapted to couple one or more I/O devices 110, 112 coupled to the bus 102. The I/O interface 108 may include at least one port 109 adapted to couple to one or more I/O device 110, 112. In some embodiments, the system 100 may include the I/O devices 110, 112. Alternatively, one or more of the I/O devices 110, 112 may be external to the system 100.

Each of the one or more processors 104 and the one or more I/O devices 110, 112 are adapted to issue respective commands requiring access to the bus 102. For example, a processor 104 or an I/O device 110, 112 may issue such a command requiring access to the bus 102 so that the command may access the memory 106 via the bus 102. However, to avoid problems of conventional systems in which one or more processors and/or I/O devices may issue commands that require bus access during the same clock cycle, thereby causing all or all but one of such commands to be issued again (e.g., reissued or retried) at a later time, the system 100 may include command reissuing logic 114 adapted to efficiently reissue commands requiring bus access which previously were not granted bus access. For example, compared to conventional command reissuing logic, the command reissuing logic 114 may reduce an amount of logic employed therein, and consequently, reduce an amount of space (e.g., chip real estate) required thereby.

Additionally, the command reissuing logic of conventional systems may reissue commands, which previously were denied bus access, such that two or more of such reissued commands require bus access during the same future clock cycle. Consequently, all or all but one of such reissued commands may be denied bus access during the future clock cycle. The command reissuing logic 114 of the present system 100 may avoid such a problem of the conventional system, and thereby efficiently retry commands, by reissuing a single command corresponding to an I/O device which previously was denied bus access at a time. Once the command reissuing logic 114 determines such a reissued command is executed or is denied bus access, the command reissuing logic 114 may reissue another command which previously was denied access to the bus. The command reissuing logic 114 may be included in the I/O interface 108 (although the command reissuing logic 114 may be located elsewhere). Details of the structure and operation of the command reissuing logic 114 are described below with reference to FIG. 2.

Figure 2:
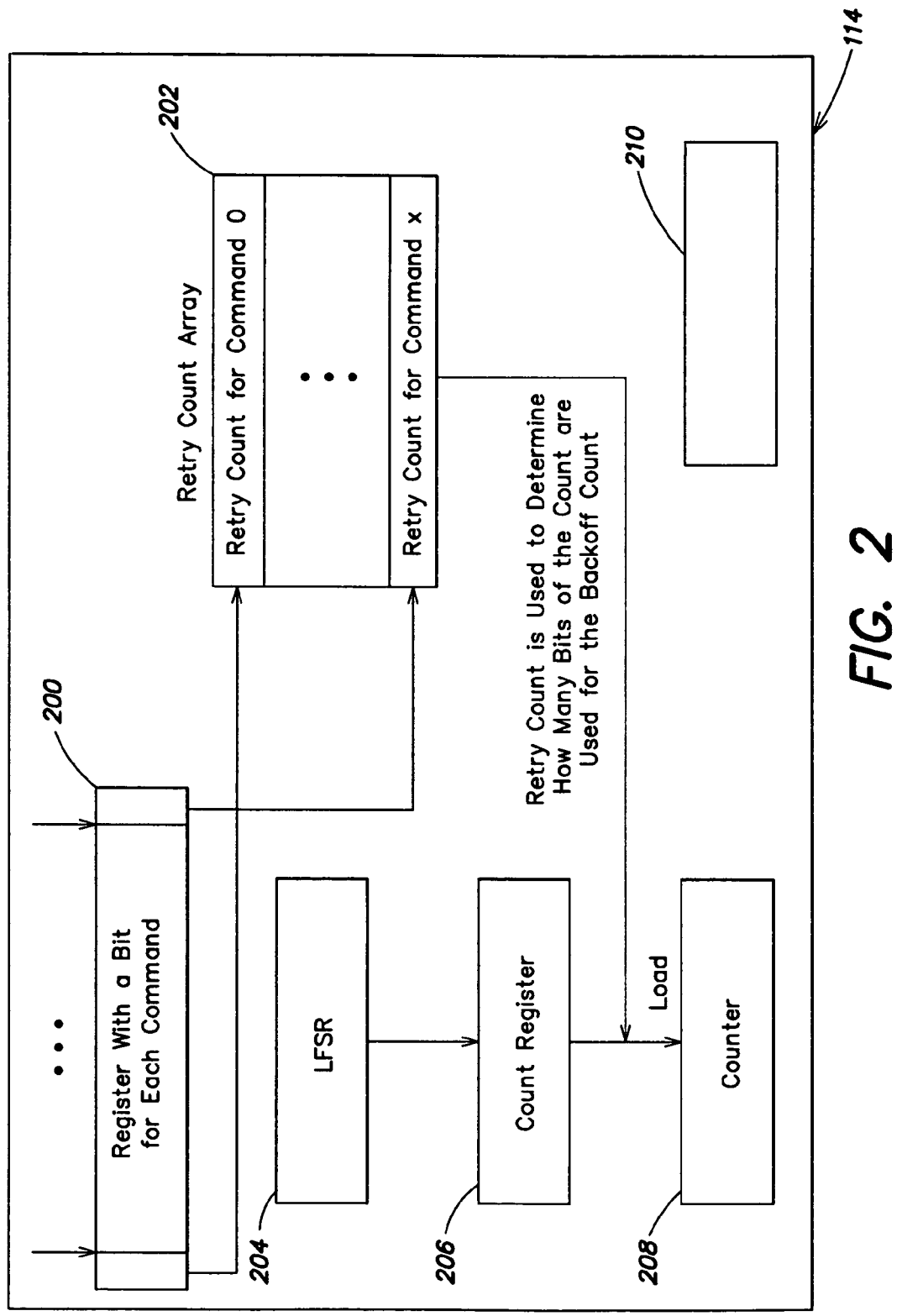
FIG. 2 illustrates the command reissuing logic of FIG. 1 in accordance with an embodiment of the present invention.

FIG. 2 illustrates the command reissuing logic 114 of FIG. 1 in accordance with an embodiment of the present invention. With reference to FIG. 2, the command reissuing logic 114 may include a first register 200 (e.g., a retry register) adapted to store bits associated with or corresponding to respective commands requiring access to the bus 102. As stated, the commands may correspond to I/O devices 110, 112 that require bus access. In some embodiments, the command reissuing logic 114 may be coupled to sixty-four I/O devices 110, 112, and therefore, potentially may receive sixty-four commands, which correspond to the I/O devices 110, 112, requiring bus access (e.g., via two ports of the I/O interface 108). In such embodiments, the first register 200 may be sixty-four bits wide (although a larger or smaller register may be employed). Consequently, for each command that may be received from an I/O device 110, 112, the first register 200 may store a bit corresponding to the command. However, the command reissuing logic 114 may receive commands requiring bus access from a larger or smaller amount of corresponding I/O devices 110, 112. Additionally or alternatively, such commands may be received from a larger or smaller number of ports 109 of the I/O interface 108.

If the command reissuing logic 114 receives a command to be reissued corresponding to a first I/O device, a bit in a first bit position (e.g., bit position 0) of the first register 200 may be asserted, if the command reissuing logic 114 receives a command to be reissued corresponding to a second I/O device, a bit in a second bit position (e.g., bit position 1) of the first register 200 may be asserted, and so on. An unasserted bit in a bit position of the first register 200 may indicate an I/O device 110, 112 corresponding to the bit position may not require access to the bus 102.

The command reissuing logic 114 may include an array 202 (e.g., a retry count array) adapted to store a count associated with each command corresponding to an I/O device 110, 112. The count (e.g., retry count) may indicate an amount of times an associated command has been previously retried. Such a count may be employed to generate a delay time after which the command reissuing logic 114 may reissue the associated command. A bit position of the first register 200 employed to store a bit associated with the command may serve as an address (e.g., an index) into the array 202. Therefore, if the first register 200 is adapted to store sixty-four bits corresponding to respective I/O devices 110, 112, the array 202 may include sixty-four entries 202 each of which may store a count associated with a command.

Additionally, the command reissuing logic 114 may include a second register 204 (e.g., a linear feedback shift register (LFSR)) adapted to generate a random (e.g., pseudo-random) number. The LFSR 204 may be 10-bits wide (although the LFSR 204 may have a larger or smaller size). For example, the LFSR 204 may generate a different random number every clock cycle. The LFSR 204 may be coupled to a third register 206 (e.g., a count register) adapted to store a value output from the LFSR 204. The third register 206 may be 10-bits wide (although the third register 206 may have a larger or smaller size). The size of the third register 206 may be based on the size of the LFSR 204. For example, if the LFSR 204 is 16-bits wide, the third register 206 is 16-bits wide. To generate the delay time for a reissued command during a clock cycle, the command reissuing logic 114 may employ the count associated with the command and apply the count to the value stored by the third register 206 during the clock cycle. The count may indicate an amount of times an associated command has been previously retried, which may indicate or determine a portion of the value stored by the third register 206 that may be employed to generate the delay time. For example, the count may indicate or determine a number of bits (e.g., least significant bits) of the value stored by the third register 206 that may be employed to generate the delay time. Additionally, the command reissuing logic 114 may include a counter 208 adapted to load the delay time and count down to zero (although the counter 208 may be adapted to count up from zero to the delay time).

The command reissuing logic 114 may employ a single register (e.g., the first register 200) to store bits corresponding to commands requiring access to the bus 102, respectively. Additionally, the command reissuing logic 114 may employ a single array 202 to store a retry count associated with each command corresponding to an I/O device 110, 112. In this manner, the array 202 may store parameters associated with commands, respectively. Such parameters may be employed to generate a delay time after which the associated command is reissued. Additionally, the command reissuing logic 114 may include a single set of logic (e.g., the LFSR 204, third register 206 and the counter 208) that may be employed to generate time delays (e.g., also referred to as backoff counts by those of skill in the art) for any retried commands, respectively. By sharing the LFSR 204, third register 206 and counter 208 among all commands corresponding to the I/O devices 110, 112, the command reissuing logic 114 may reduce an amount of logic employed therein (compared to conventional command retry logic).

During system operation, when a command corresponding to an I/O device 110, 112 is retried (e.g., not granted bus access during a clock cycle, and therefore, must be reissued), the system 100 may send the command to the command reissuing logic 114. A bit may be asserted in a bit position of the first register 200 corresponding to the retried command. For example, if a command from a second I/O device 110, 112 is retried, a bit in a second bit position (e.g., bit position 1) of the first register 200 may be asserted. Subsequently, if a command from a sixty-fourth I/O device 110, 112 is retried, a bit in a sixty-fourth bit position (e.g., bit position 63) of the first register 200 may also be asserted (assuming the second command has not been retried yet). Consequently, during a given time period (e.g., one or more clock cycles), one or more commands may be awaiting retry. Bits may remain deasserted in respective bit positions of the first register 200 which correspond to commands from I/O devices 110, 112 that have not been retried.

The command reissuing logic 114 may be adapted to select one of the awaiting commands to be retried. In some embodiments, to select an awaiting command, the command reissuing logic 114 may search the first register 200 for a bit position storing an asserted bit starting from known bit position, such as the most significant bit (MSB) position (e.g., bit position 0), through remaining bit positions (e.g., through the least significant bit position (LSB)) until an asserted bit is found. The MSB bit position may be the leftmost bit position and the LSB bit position may be the rightmost bit position of the first register 200 or vice versa.

However, the command reissuing logic 114 may employ different methods to select one of the awaiting commands to be retried. Such other methods may be fairer than the method described above in which the command reissuing logic 114 starts from the same known first register bit position when selecting an awaiting command to be retried. For example, in some embodiments, the command reissuing logic 114 may include logic, such as a fourth register 210, adapted to store data (e.g., a pointer) indicating the last bit position of the first register 200 from which an awaiting command was selected to be retried. Therefore, the command reissuing logic 114 may track the first register bit position corresponding to the last command selected to be retried. When the system 100 is ready to retry another command from an I/O device 110, 112, the command reissuing logic 114 may access the fourth register 210 to determine the last bit position of the first register 200 from which the previously-retried command was selected. The command reissuing logic 114 may search the first register 200 for a bit position storing an asserted bit starting from the last bit position stored in the fourth register 210 through remaining bit positions (e.g., through the least significant bit position (LSB)) until an asserted bit is found. If the command reissuing logic 114 is unable to find an asserted bit from the last bit position through remaining bit positions of the first register 200 (e.g., through the end of the first register 200), the command reissuing logic 114 may search the first register 200 for a bit position storing an asserted bit starting from known bit position, such as the most significant bit (MSB) position (e.g., bit position 0), through remaining bit positions (e.g., through the least significant bit position (LSB)) until an asserted bit is found. The fourth register 210 may be six bits wide (although a larger or smaller size may be employed).

Regardless of the method used to select an awaiting command to be retried, once the command reissuing logic 114 finds a bit position including an asserted bit, the command from an I/O device 110, 112 corresponding to the bit position is selected as the next command to be retried. In this manner, for example, when a time comes for a next command to get retried, the command reissuing logic 114 may search the first register 200 by moving to the right from that location until an active command to be retried is found and may select that command as the next command to be retried. In the event the command reissuing logic 114 reaches the end of the first register 200 without finding a command to retry, the command reissuing logic 114 may search the first register 200 to find the leftmost command available and that command may be retried next.

Once the command reissuing logic 114 selects an awaiting command to be retried, the bit position of the first register 200 corresponding to the selected command may be employed to access the array 202. More specifically, an index into the first register 200 may be employed as an address used to access the array 202. In this manner, the command reissuing logic 114 may access a count, which indicates a number of times the selected command was previously retried, associated with the selected command from the array 202. For example, if the command reissuing logic 114 selects a command to be retried corresponding to bit position 10 (which may be the eleventh bit position), the command reissuing logic 114 may access the count stored in an eleventh entry of the array 202. As described in further detail below, a time delay employed after which the selected command is reissued may be based on the count associated with the selected command. Further, the command reissuing logic 114 may update (e.g., increment) the count associated with the selected command which is read from the array 202, and store the updated count back into the corresponding entry of the array 202. In this manner, the retry count associated with the selected command remains accurate.

The LFSR 204 may generate a random (e.g., pseudo-random) number every time period. The LFSR 204 may output the random number to the third register 206, which stores the number. In some embodiments, the random number may be generated and stored while an awaiting command is selected and a count associated with the selected command is accessed. Once the count associated with the selected command is determined (e.g., accessed from the array 202), the count may be applied to the random number stored in the third register 206. The count may indicate or determine a portion of the stored random number that is employed to generate the time delay. For example, the count may indicate a number of low-order bits (e.g., a number of the least significant bits) of the stored random number that is employed to generate the time delay. However, the count may indicate a different portion (e.g., a number of the most significant bits) of the stored random number that is employed to generate the time delay. By indicating a number of bits of the random number that may be employed to create the time delay, the count may exponentially increase or decrease the current time delay (compared to previously-generated time delay). For example, in some embodiments, if a count associated with a selected command indicates the command has been previously retried greater than or equal to seven times, 8 bits (e.g., low-order bits) of the random number may be employed to create the time delay. If a count associated with a selected command indicates the command has been previously retried six times, 7 bits (e.g., low-order bits) of the random number may be employed to create the time delay. Similarly, if a count associated with a selected command indicates the command has been previously retried five times, 6 bits (e.g., low-order bits) of the random number may be employed to create the time delay, and so on. However, the relationship between the number of times a selected command has been previously retried and the portion of the random number employed to create the time delay may be different.

The third register 206 may output the stored random number. The command reissuing logic 114 may select the portion of the random number indicated or determined by the count associated with the selected command to generate the time delay, and store or load the time delay in the counter 208.

Once the counter 208 is loaded with the time delay, the counter 208 may count down to zero from the time delay (although the counter 208 may be adapted to count up from zero to the delay time). The command reissuing logic 114 may issue the selected command again after the counter 208 counts down to zero from the delay time (or counts up to the delay time) as described above. In this manner, command reissuing logic 114 may reissue the selected command after waiting the delay time.

If such a reissued selected command is subsequently granted bus access and completes (e.g., executes), a count associated with the selected command stored in the array 202 may be updated or reset to zero (e.g., zeroed out). Alternatively, if the reissued selected command is denied bus access again, the system 100 may send the command to the command reissuing logic 114, which may generate a new time delay after which such a command may be reissued. The new time delay may be larger than the previous time delay after which the command was previously reissued. Therefore, a command which has already been retried may be retried one or more times using an exponentially-increasing time delay. Consequently, the impact of such a command on the system 100 may be reduced. In some embodiments, the command reissuing logic 114 may not reissue an I/O command until a previously reissued I/O command completes or is sent back to the command reissuing logic 114.

Through use of the present methods and apparatus, a single set of logic (e.g., the LFSR 204, count register 206 and counter 208) may be employed to retry all commands. Further, a single array 202 may be employed to store a count for each command corresponding to an I/O device 110, 112. As stated, the count may indicate an amount of times an associated command has been previously retried. In this manner, a single counter 208 may be employed to count off a time delay for a command wherein the time delay is based on a previous retry count (e.g., an individual command backoff state or parameters) associated with the command. Consequently, the command reissuing logic 114 may consume minimal hardware and still store a retry count for each command. To wit, the present methods and apparatus may allow multiple users (e.g., I/O devices 110, 112) to share a single retry backoff mechanism (e.g., the LFSR 204, count register 206 and counter 208) to generate a time delay, and still maintain individual backoff parameters (e.g., counts associated with commands from I/O devices 110, 112, respectively). Generally, by sharing logic in the manner described above, an amount of logic (e.g., LFSRs 204, third registers 206, counters 208, etc.) included in the command reissuing logic 114 may be reduced, and consequently, chip space required by the command reissuing logic 114 may be reduced (compared to conventional command reissuing logic 114). More specifically, in this manner, the command reissuing logic 114 may efficiently employ logic and occupy chip space.

Further, the command reissuing logic 114 may retry an I/O command after waiting for a previously-retried command to complete or to be sent back to the command reissuing logic 114 after being denied bus access again, thereby reducing a likelihood that the retried I/O command will be denied bus access. Additionally, the command reissuing logic 114 may employ an exponentially-increasing time delay for an I/O command which has already been retried, thereby reducing the frequency that such a retried command may consume system resources. In this manner, the command reissuing logic 114 may efficiently reissue commands.

The present methods and apparatus may be particularly useful in systems including a plurality of streams or channels (e.g., I/O devices) coupled to a few ports (e.g., of the I/O interface 108) employed to couple to the bus 102. For example, 64 I/O devices 110, 112 may be coupled to the bus 102 via two ports 109. In such systems, a plurality of channels or streams may require bus access. However, it is undesirable in such systems to penalize all channels or streams for a small number of commands getting multiple retries.

For proper operation of systems including an EIB, there exists a need to have some random delay before a command accessing the bus gets retried. The random delay helps to reduce the possibility of a harmonic condition occurring in which commands continue to request resources on the bus at the same time (e.g., during the same clock cycle), resulting in one of the commands getting retried forever.

In such systems, individual commands in an I/O subsystem (e.g., the I/O interface) may need to be tracked to determine whether they have been retried and how many times they have been retried. For each command that is to be retried, the system needs to determine how much time it should wait before retrying the command. The preferred method of determining how much time to wait is to use an LFSR to create a pseudo-random count with an exponential backoff feature for each command to increase the amount of delay the more times the command gets retried. However, there are a large number of commands to keep track of, each potentially having been retired a various number of times. Because each command employs its own LFSR and exponential backoff, a lot of hardware may be required.

To avoid problems of such systems, the present methods and apparatus may utilize a single LFSR and exponential backoff mechanism for all of the commands. Further, the present methods and apparatus may keep track of the number of times each command had been retried in a single separate array.

The foregoing description discloses only exemplary embodiments of the invention. Modifications of the above disclosed apparatus and methods which fall within the scope of the invention will be readily apparent to those of ordinary skill in the art. For instance, although the system 100 shown above include a single I/O interface 108 having command reissuing logic 114, in some embodiments the system 100 may include a larger number of I/O interfaces 108 each of which may include command reissuing logic 114.

Accordingly, while the present invention has been disclosed in connection with exemplary embodiments thereof, it should be understood that other embodiments may fall within the spirit and scope of the invention, as defined by the following claims.

The invention claimed is:

1. A method of reissuing a command involving bus access, the method comprising:
storing information associated with commands that are to be reissued, wherein the commands are each associated with respective input/output (I/O) devices seeking bus access;
storing a count for each of the commands, each count indicating a number of times the associated command has been reissued;
selecting a command to be reissued, from among the commands, based on the information associated with the command; and
determining a delay after which the selected command will be reissued, wherein the delay is determined based on the count associated with the selected command.

2. The method of claim 1 wherein:
storing information associated with commands that are to be reissued includes storing information associated with commands that are to be reissued in a register; and
storing a count for each of the commands includes storing a count for each of the commands in an array.

3. The method of claim 1 further comprising reissuing the selected command after waiting the delay.

4. The method of claim 1 further comprising incrementing the count associated with the selected command.

5. The method of claim 1 wherein determining the delay after which the selected command will be reissued includes employing the same logic to determine a delay for any selected command.

6. The method of claim 1 wherein selecting the command includes selecting the command based on a previous command selected by selecting information associated with the previous command.

7. The method of claim 1 wherein determining the delay after which the selected command will be reissued includes:
generating a random number;
generating the delay based on the random number and the count associated with the selected command;
wherein the same logic is employed to generate the delay for any selected command.

8. The method of claim 2 wherein selecting the command includes selecting the command based on a predetermined bit position of the register.

9. The method of claim 3 further comprising resetting the count associated with the reissued command when the reissued command completes.

10. The method of claim 3 further comprising storing information associated with the reissued command again if the reissued command is to be reissued again.

11. The method of claim 7 wherein determining the delay based on the random number and the count associated with the selected command includes:
determining a predetermined portion of the random number to employ to generate the delay; and
employing the predetermined portion of the random number to generate the delay.

12. An apparatus for reissuing a command involving bus access, comprising:
command reissuing logic having:
a register; and
an array coupled to the register;
the command reissuing logic is adapted to:
store information associated with commands that are to be reissued, wherein the commands are each associated with respective input/output (I/O) devices seeking bus access;
store a count for each of the commands, each count indicating a number of times the associated command has been reissued;
select a command to be reissued, from among the commands, based on the information associated with the command; and
determine a delay after which the selected command will be reissued, wherein the delay is determined based on the count associated with the selected command.

13. The apparatus of claim 12 wherein the command reissuing logic is further adapted to:
store information associated with commands that are to be reissued in the register; and
store a count for each of the commands in the array.

14. The apparatus of claim 12 wherein the command reissuing logic is further adapted to reissue the selected command after waiting the delay.

15. The apparatus of claim 12 wherein the command reissuing logic is further adapted to increment the count associated with the selected command.

16. The apparatus of claim 12 wherein the command reissuing logic is further adapted to employ the same logic to determine a delay for any selected command.

17. The apparatus of claim 12 wherein the command reissuing logic is further adapted to select the command based on a previous command selected by selecting information associated with the previous command.

18. The apparatus of claim 12 wherein:
the command reissuing logic further includes a shift register adapted to generate a random number;
the command reissuing logic is further adapted to generate the delay based on the random number and the count associated with the selected command; and
the same register, array and shift register are employed to generate the delay for any selected command.

19. The apparatus of claim 13 wherein the command reissuing logic is further adapted to select the command based on a predetermined bit position of the register.

20. The apparatus of claim 11 wherein the command reissuing logic is further adapted to reset the count associated with the reissued command when the reissued command completes.

21. The apparatus of claim 11 wherein the command reissuing logic is further adapted to store information associated with the reissued command again if the reissued command is to be reissued again.

22. The apparatus of claim 18 wherein the command reissuing logic is further adapted to:
determine a predetermined portion of the random number to employ to generate the delay; and
employ the predetermined portion of the random number to generate the delay.

23. A system, comprising:
a processor;
a plurality of input/output (I/O) devices;
a bus, coupled to the I/O devices and the processor, and adapted to receive commands from the I/O devices and the processor; and
an apparatus for reissuing a command involving bus access including:
command reissuing logic having:
a register; and
an array coupled to the register;
the command reissuing logic is adapted to:
store information associated with commands that are to be reissued, wherein the commands are each associated with respective input/output (I/O) devices seeking bus access;

store a count for each of the commands, each count indicating a number of times the associated command has been reissued;

select a command to be reissued, from among the commands, based on the information associated with the command; and determine a delay after which the selected command will be reissued, wherein the delay is determined based on the count associated with the selected command.

24. The system of claim 23 wherein the command reissuing logic is further adapted to:

store information associated with commands that are to be reissued in the register; and store a count for each of the commands includes storing a count for each of the commands in the array.

25. The system of claim 23 wherein the command reissuing logic is further adapted to:

reissue the selected command after waiting the delay; and at least one of:

reset the count associated with the reissued command when the reissued command completes; and store information associated with the reissued command in the register again if the reissued command is to be reissued again.

* * * * *